United States Patent
Bland

(10) Patent No.: US 9,340,254 B2
(45) Date of Patent: May 17, 2016

(54) ELECTRIC MOTORCYCLE WITH ADJUSTABLE SQUAT RATIO ISOLATED FROM VEHICLE GEOMETRY

(71) Applicant: Brammo, Inc., Talent, OR (US)

(72) Inventor: Aaron Bland, Ashland, OR (US)

(73) Assignee: Brammo, Inc., Talent, OR (US)

( * ) Notice: Subject to any disclaimer, the term of this patent is extended or adjusted under 35 U.S.C. 154(b) by 0 days.

(21) Appl. No.: 14/687,589

(22) Filed: Apr. 15, 2015

(65) Prior Publication Data

US 2015/0367907 A1 Dec. 24, 2015

Related U.S. Application Data

(60) Provisional application No. 61/979,804, filed on Apr. 15, 2014.

(51) Int. Cl.
| | |
|---|---|
| *B62D 61/00* | (2006.01) |
| *B62K 25/28* | (2006.01) |
| *B62K 11/04* | (2006.01) |
| *B62M 7/02* | (2006.01) |
| *B62K 25/04* | (2006.01) |

(52) U.S. Cl.
CPC .............. *B62K 25/283* (2013.01); *B62K 11/04* (2013.01); *B62M 7/02* (2013.01); *B62K 2025/045* (2013.01); *B62K 2204/00* (2013.01); *Y10T 29/49718* (2015.01)

(58) Field of Classification Search
CPC ........ B62D 61/02; B62D 65/02; B62K 5/027; B62K 5/06
USPC .......... 180/210, 213, 214, 216, 218, 219, 220
See application file for complete search history.

(56) References Cited

U.S. PATENT DOCUMENTS

| | | | |
|---|---|---|---|
| 4,696,363 A | 9/1987 | Enda | |
| 6,213,238 B1 | 4/2001 | Buell et al. | |
| 6,899,193 B1 | 5/2005 | Anibas | |
| 8,251,164 B2 | 8/2012 | McGee | |
| 8,672,077 B2 | 3/2014 | Sand et al. | |
| 2012/0111651 A1* | 5/2012 | Irie | B62K 11/04 180/65.1 |
| 2013/0081894 A1* | 4/2013 | Ishikawa | B62M 7/04 180/220 |
| 2013/0216885 A1* | 8/2013 | Kawatani | H01M 2/1083 429/100 |
| 2013/0270938 A1* | 10/2013 | Matsuda | B60K 1/00 310/54 |
| 2013/0299265 A1 | 11/2013 | Marazzi | |
| 2014/0305729 A1* | 10/2014 | Testoni | B62K 11/04 180/220 |
| 2014/0367184 A1* | 12/2014 | Matsuda | B62K 11/04 180/220 |
| 2014/0368211 A1* | 12/2014 | Inoue | B60L 3/0069 324/509 |
| 2015/0008061 A1* | 1/2015 | Matsuda | B62K 11/04 180/220 |
| 2015/0075889 A1* | 3/2015 | Eguchi | B62K 11/04 180/220 |
| 2015/0112569 A1* | 4/2015 | Yamane | B60W 30/04 701/72 |
| 2015/0232150 A1* | 8/2015 | Kosuge | B62M 7/02 180/220 |
| 2015/0251540 A1* | 9/2015 | Matsuda | H01M 2/1072 701/22 |
| 2015/0274020 A1* | 10/2015 | Matsuda | B60L 7/26 701/70 |

OTHER PUBLICATIONS

Cossalter, Vittore, "Motorcycle Dynamics—Squat ratio and squat angle," Second Edition, chapter 6.1.3, pp. 213-219, 2006 ISBN: 978-1-4303-0861-4.

* cited by examiner

*Primary Examiner* — Toan To

(74) *Attorney, Agent, or Firm* — Rajesh Vallabh; Foley Hoag LLP

(57) ABSTRACT

Methods and apparatus are disclosed for adjusting the squat ratio of electric motorcycles and other electric vehicles, wherein the squat ratio adjustment is isolated from other chassis parameters.

22 Claims, 5 Drawing Sheets

ELECTRIC MOTORCYCLE WITH ADJUSTABLE SQUAT RATIO ISOLATED FROM VEHICLE GEOMETRY

CROSS REFERENCE TO RELATED APPLICATION

This application claims priority from U.S. Provisional Patent Application No. 61/979,804 filed on Apr. 15, 2014 entitled ELECTRIC MOTORCYCLE WITH ADJUSTABLE SQUAT RATIO ISOLATED FROM VEHICLE GEOMETRY, which is hereby incorporated by reference.

BACKGROUND

The present application relates generally to two and three-wheeled electric motorcycles and other electric vehicles and, more particularly, to a method and apparatus for adjusting the squat ratio of such vehicles.

The rear suspension design for motorcycles requires consideration of the motion and forces imparted by the terrain over which the vehicle travels and the forces imparted by the vehicle drivetrain, as well as other less critical factors.

Squat ratio is a conventional term used by motorcycle chassis engineers and technicians to define the degree of coupling between drivetrain forces and suspension forces. An "ideal" squat ratio depends on the performance, geometry, and mass characteristics of the motorcycle, characteristics of the terrain, and preferences of the rider. An adjustable squat ratio for a motorcycle would be beneficial for most motorcycles regardless of type, and of critical importance for motorcycles with high power (high drivetrain force levels), especially those intended for performance applications such as sport riding or racing.

BRIEF SUMMARY OF THE DISCLOSURE

An electric motorcycle with an adjustable squat ratio in accordance with one or more embodiments includes a front wheel, a rear wheel, a chassis comprising a front suspension on which the front wheel is mounted, a rear suspension on which the rear wheel is mounted, and a frame connected to the front suspension and the rear suspension. The rear suspension comprises a swing arm having a first portion pivotally connected to the frame at a suspension pivot point and a second portion supporting an axle of the rear wheel. The motorcycle further comprises an electric motor with a transmission assembly including a pinion sprocket or pulley and a flexible transmission member engaged with the pinion sprocket or pulley for providing a motive force to the rear wheel. The motorcycle also includes an adjustable motor mount assembly having a plurality of mounting positions for connecting the electric motor to the frame in a selected one of a plurality of mounting positions. The mounting position are selectable to adjust a position of the pinion sprocket or pulley relative to the frame to achieve a desired squat ratio for the motorcycle.

In accordance with one or more embodiments, a method is disclosed for adjusting the squat ratio of an electric motorcycle. The motorcycle includes a front wheel, a rear wheel, a chassis comprising a front suspension on which the front wheel is mounted, a rear suspension on which the rear wheel is mounted, and a frame connected to the front suspension and the rear suspension. The rear suspension comprises a swing arm having a first portion pivotally connected to the frame at a suspension pivot point and a second portion supporting an axle of the rear wheel. The motorcycle also includes an electric motor with a transmission assembly including a pinion sprocket or pulley and a flexible transmission mechanism for providing a motive force to the rear wheel. The motorcycle further includes an adjustable motor mount assembly having a plurality of mounting positions for connecting the electric motor to the frame in a selected one of a plurality of mounting positions. The method comprises the steps of: adjusting the pinion sprocket or pulley relative to the frame from a current mounting position to another mounting position; and fixing the pinion sprocket or pulley at said another mounting position to thereby adjust the squat ratio of the motorcycle.

DETAILED DESCRIPTION

Various embodiments disclosed herein are directed to methods and apparatus for adjusting the squat ratio of electric motorcycles and other electric vehicles, wherein the squat ratio adjustment is isolated from other chassis parameters.

Figure 1:
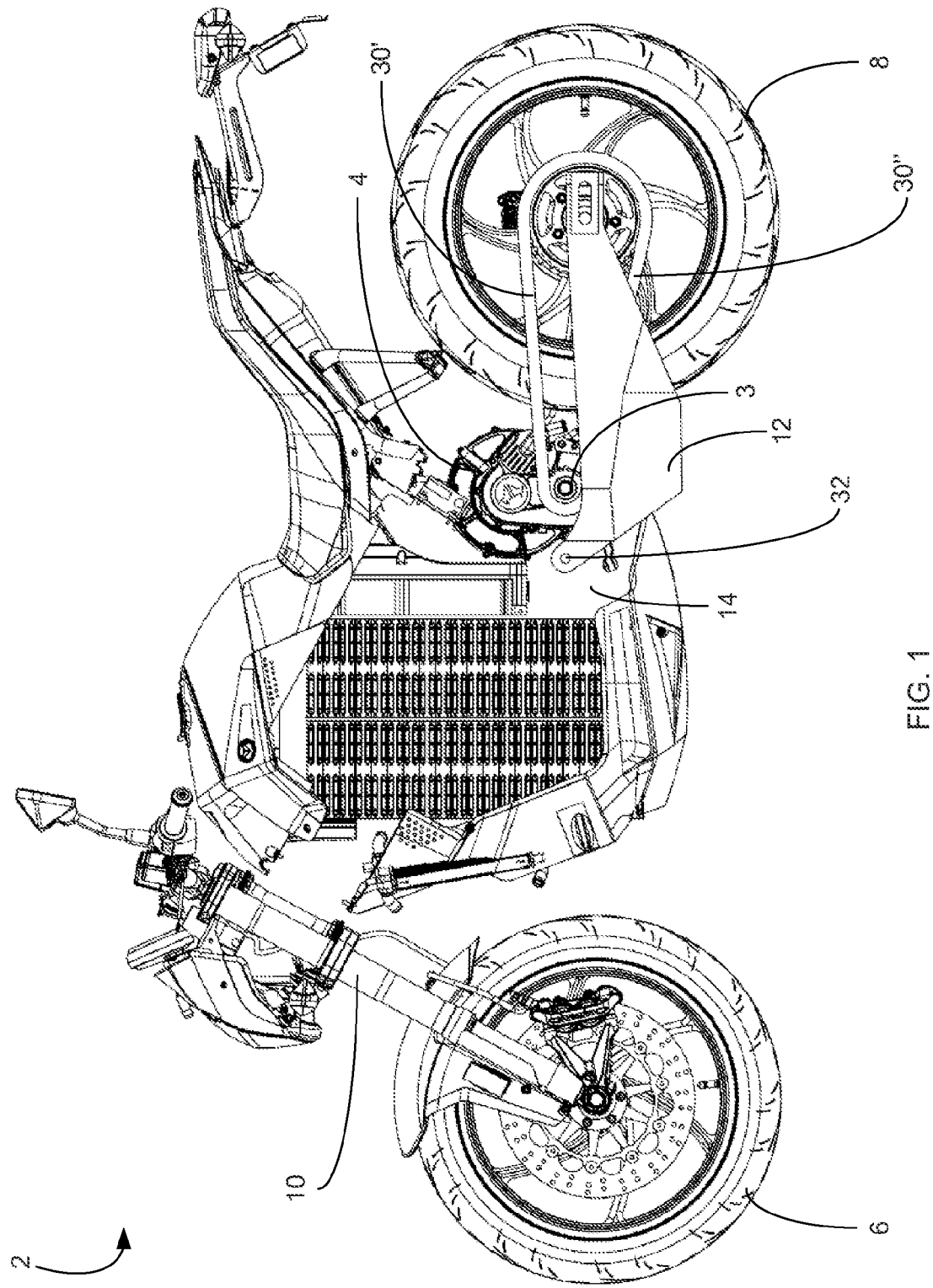
FIG. 1 is a side view of an exemplary electric motorcycle.

FIG. 1 illustrates an exemplary electric motorcycle 2, which comprises a battery powered electric vehicle with an electric traction motor 4. Although the motorcycle 2 shown in the figure has two wheels (front wheel 6 and rear wheel 8), electric motorcycles in accordance with one or more embodiments may also have three wheels. The motorcycle 2 includes a chassis comprising a front suspension 10 on which the front wheel 6 is mounted, a rear suspension (including a swing arm 12), on which the rear wheel 8 is mounted, and a frame 14 connected between the front and rear suspensions.

As discussed in further detail below with reference to FIG. 2, the squat ratio for an electric motorcycle is the ratio between the moment on the suspension assembly of the motorcycle generated by load transfer and the moment on the suspension assembly generated by the chain force and the driving force. The squat ratio can be expressed as the ratio between the tangent of the angle of the load transfer line 22 (with respect to ground 28) and the tangent of angle of the squat line 24 (with respect to ground 28).

The instant center is the point in a body undergoing planar movement that has zero velocity at a particular instant of time. At this instant, the velocity vectors of the trajectories of other points in the body generate a circular field around this point that is identical to what is generated by a pure rotation.

The load transfer line 22 is the resultant force vector direction of the horizontal driving force and the load transfer vertical load acting on the contact patch 26 of a tire, oriented with respect to ground 28.

The squat line 24 is a theoretical line intersecting the contact patch 26 of the driving tire and a second point, defined by the instant force center (or intersection point) of the chain 30 and a line drawn between the suspension pivot point 32 and wheel axle 34.

The term Drive refers to the mode of operation of a vehicle when the vehicle is transmitting power through the drivetrain to propel the vehicle.

Regen refers to energy recovery utilizing an electric traction motor 4 as a generator and driving it mechanically from the rear wheel through the final drive.

Figure 2:
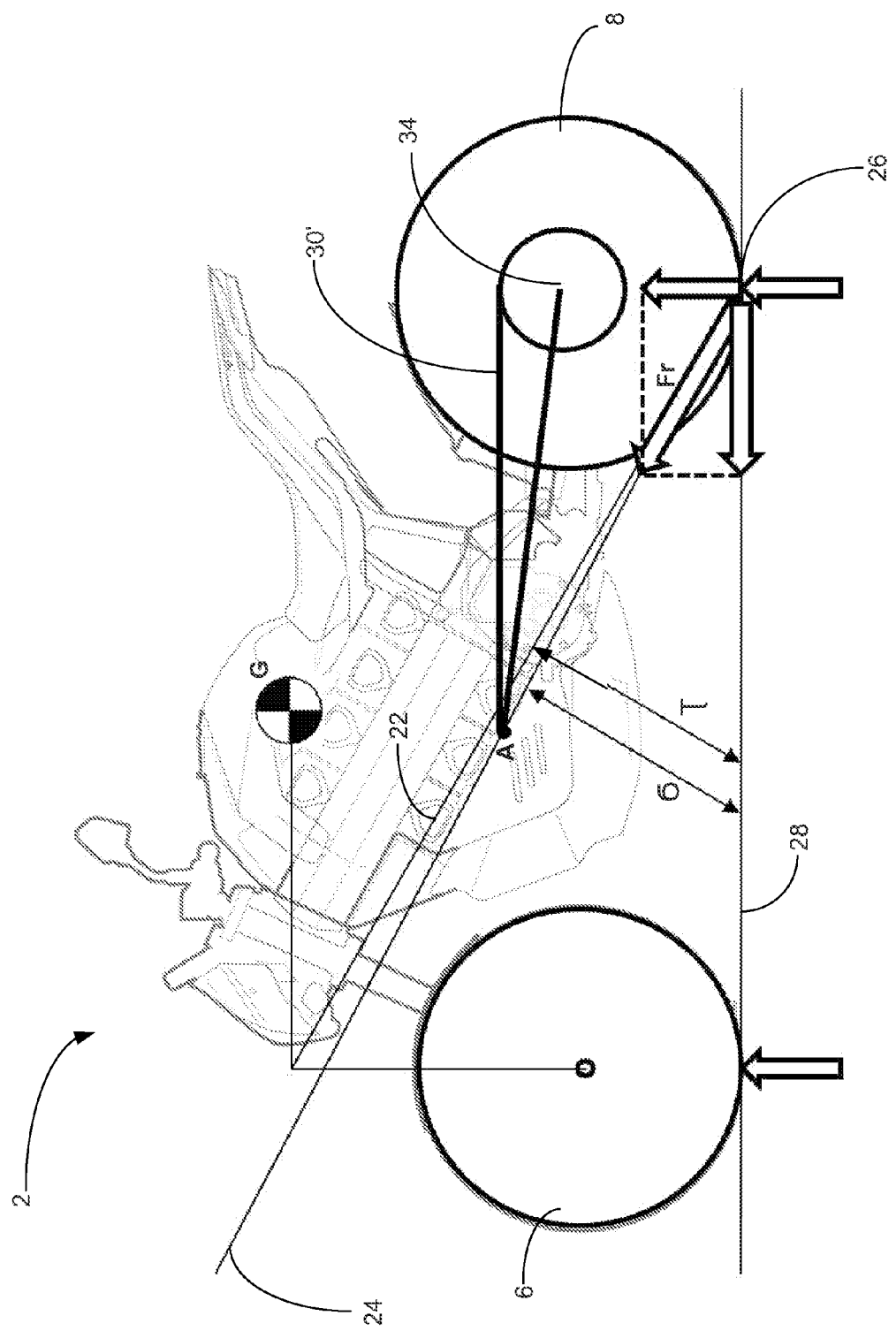
FIG. 2 is a side view of an electric motorcycle, illustrating the squat ratio of the motorcycle.

In FIG. 2, Point A (an instant center) is formed by the intersection between a line passing through the upper motorcycle chain 30′ (for drive) or the lower motorcycle chain 30″ (for regen), and a second line passing through the center 34 of the rear wheel 8 and the swing arm pivot point 32 (actual or instant center). Note that the drawing is not to scale.

The squat line 24 passes through the contact patch 26 of the rear tire and point A. The angle of this line to the ground plane 28 is called the squat angle and is represented by the symbol "σ".

The load transfer line 22 is the result of the load transfer force (a function of center of mass location and wheelbase) and the driving force, acting at the contact patch 26 of the rear wheel. Its angle to horizontal is represented by the symbol "τ".

The Squat Ratio is the ratio between the moment generated by the sum of the chain force and driving force to the moment generated by the load transfer: $R = \tan \tau / \tan \sigma$.

In accordance with one or more embodiments, a mechanism is provided for adjusting the squat ratio of an electric motorcycle 2 by changing the position of pinion sprocket 3 of the motorcycle 2 without affecting the vehicle geometry or significantly affecting the center of mass position G. Adjusting squat ratio in the prior art for motorcycles with internal combustion engines and electric motor powered motorcycles utilizes an adjustable pivot point 32, which changes vehicle geometry with adjustments, imposing tuning compromises and complexity. A technical advantage of mechanisms for adjusting squat ratio in accordance with one or more embodiments is that the squat ratio can be adjusted without affecting other critical chassis parameters such as front and rear ride height, rake and trail, seat height, wheelbase, etc. It also does not significantly affect the center of mass position, since a very small portion of the vehicle mass is moved with respect to the chassis. Conventional squat ratio adjustment may result in a significant center of mass change due to raising the chassis and/or requiring other chassis parameters to be adjusted to compensate for the change.

Figure 3:
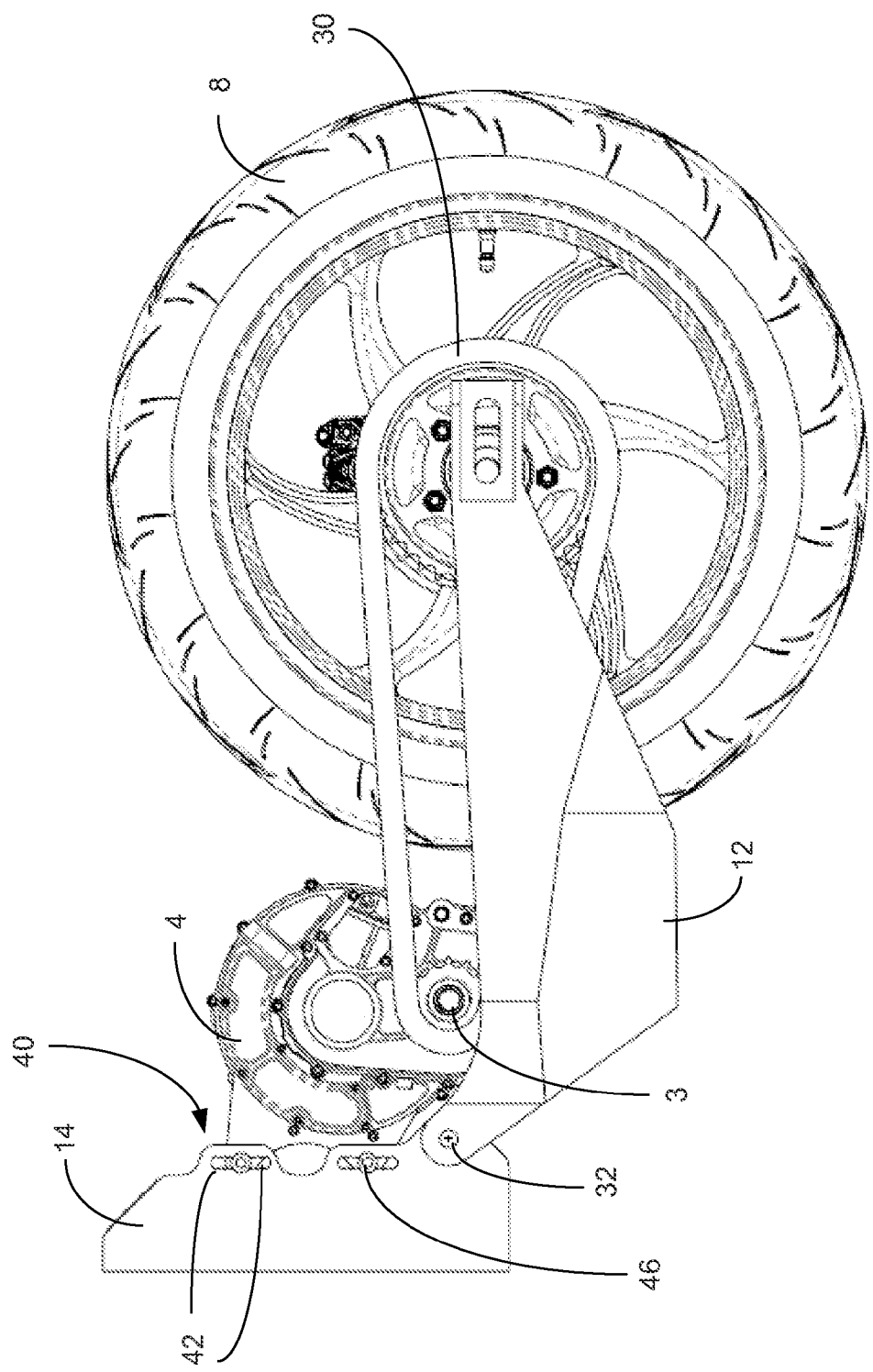
FIG. 3 illustrates a mechanism for adjusting the pinion sprocket position of a motorcycle to adjust squat ratio in accordance with one or more embodiments.
Figure 4:
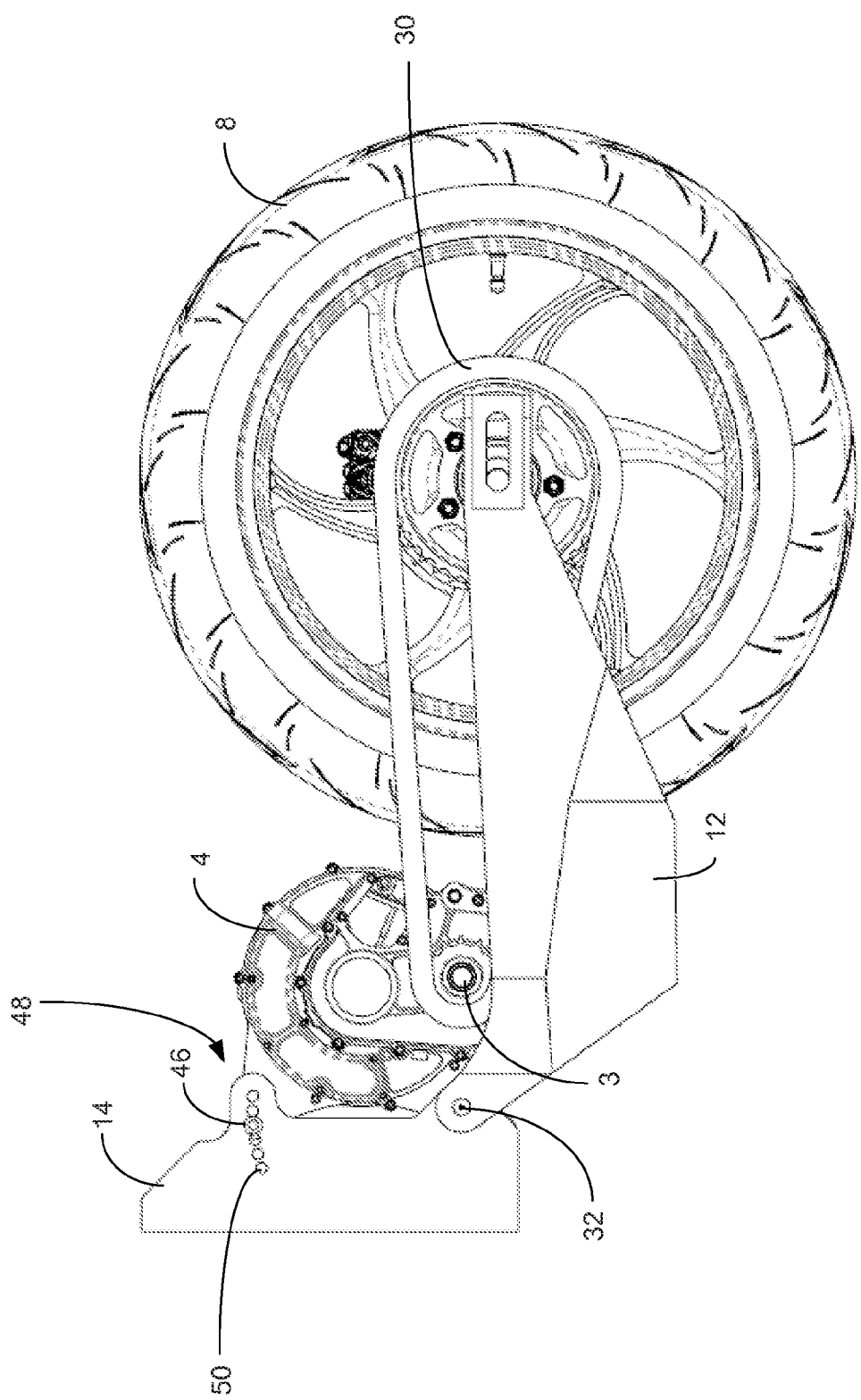
FIG. 4 illustrates an alternate mechanism for adjusting the pinion sprocket position of a motorcycle to adjust squat ratio in accordance with one or more embodiments.

FIGS. 3 and 4 illustrate exemplary mechanisms for adjusting the squat ratio in a motorcycle 2 in accordance with one or more embodiments.

The mechanisms can be used to change the position of the pinion sprocket 3 of the motorcycle 2 by altering the position of the electric motor 4. This can be done by selecting from alternate positions of the motor mount assembly. In the FIG. 3 embodiment, the motor mount assembly 40 provides a vertical linear adjustment range for the electric motor and pinion sprocket assembly at the plurality of motor mounting points 42 on the frame. Motor mounting hardware 46 (e.g., bolts) and mating components (e.g., nuts) provide a fully constrained mounting method to the chassis when installed.

In the FIG. 4 embodiment, the motor mount assembly 48 provides for radial adjustment of the electric motor and pinion sprocket assembly. This results in a vertical adjustment (following a small section of an arc) of the pinion sprocket 3 because the electric motor and pinion sprocket assembly is mounted to the suspension pivot 32, and can rotate about it during the adjustment procedure. The electric motor and pinion sprocket assembly is then fixed in place when one of the radial mounting holes 50 is selected. Motor mounting hardware 46 (e.g., bolts) and mating components (e.g., nuts) illustrated in FIG. 4 provide a fully constrained mounting method to the chassis when installed.

In accordance with one or more alternate embodiments, the mechanism for adjusting the squat ratio can comprises a variety of other adjustment mechanisms for changing the vertical or radial position of the pinion sprocket or driving pulley, at either discrete incremental or infinitely variable positions. The adjustment mechanisms can include adjustment hardware such as, e.g., adjustment screws and removable hardware.

Figure 5:
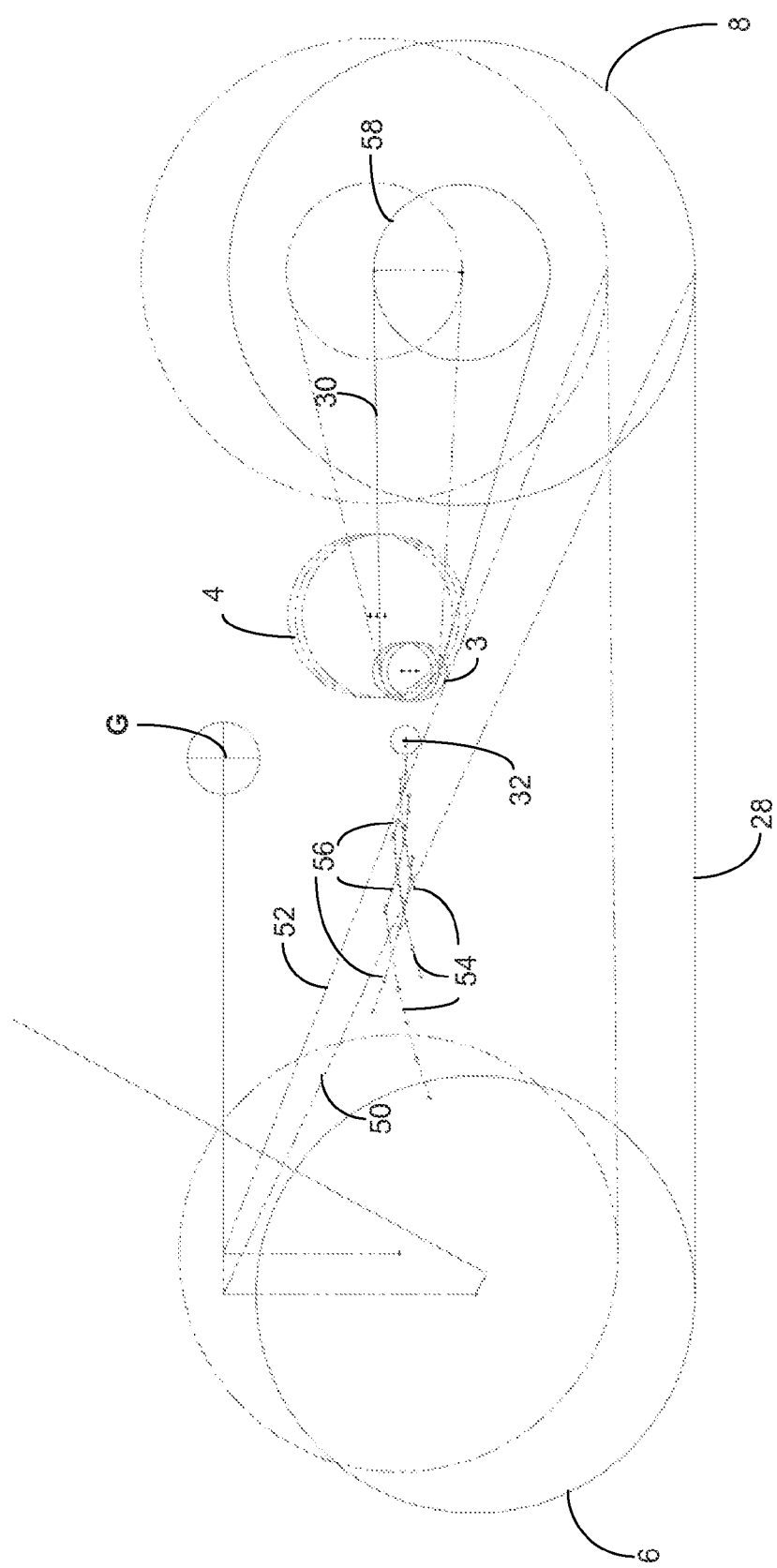
FIG. 5 schematically illustrates the effects of adjusting the pinion sprocket position on the squat ratio of the motorcycle.

FIG. 5 schematically illustrates the effects of adjusting the position of the pinion sprocket 3 using the mechanisms of FIGS. 3 and 4 on the squat ratio of the motorcycle 2 without motorcycle geometry adjustment. The instant center paths plot point "A" (shown in FIG. 2) through suspension movement for Drive and Regen. Reference number 50 in FIG. 5 indicates the load transfer line at full suspension extension (reference). Reference number 52 indicates the load transfer line full suspension compression. Reference number 54 indicates the instant center paths for Regen. Reference number 56 indicates the instant center paths for Drive. Reference number 58 indicates the rear wheel sprocket.

In the illustrated embodiments, the motorcycle includes a pinion sprocket and roller chain. It should be understood that other flexible transmission members can be used in place of the roller chain such as, e.g., a belt, in which case a driving pulley may be used instead of a pinion sprocket.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. An electric motorcycle with an adjustable squat ratio, comprising:
    a front wheel;
    a rear wheel;
    a chassis comprising a front suspension on which the front wheel is mounted, a rear suspension on which the rear wheel is mounted, and a frame connected to the front suspension and the rear suspension, said rear suspension comprising a swing arm having a first portion pivotally connected to the frame at a suspension pivot point and a second portion supporting an axle of the rear wheel;
    an electric motor with a transmission assembly including a pinion sprocket or pulley and a flexible transmission member engaged with the pinion sprocket or pulley for providing a motive force to the rear wheel; and
    an adjustable motor mount assembly having a plurality of mounting positions for connecting the electric motor to the frame in a selected one of a plurality of mounting positions, said mounting position being selectable to adjust a position of the pinion sprocket or pulley relative to the frame to achieve a desired squat ratio for the motorcycle.

2. The electric motorcycle of claim 1, wherein the adjustable motor mount assembly is configured to enable the squat ratio of the motorcycle to be adjusted without affecting the motorcycle geometry.

3. The electric motorcycle of claim 2, wherein the motorcycle geometry comprises chassis parameters including front and rear ride height, rake and trail, seat height, and wheelbase of the electric motorcycle.

4. The electric motorcycle of claim 1, wherein the adjustable motor mount assembly is configured to enable the squat ratio of the motorcycle to be adjusted without significantly changing a center of mass position of the electric motorcycle.

5. The electric motorcycle of claim 1, wherein the adjustable motor mount assembly comprises mounting hardware and an aperture in the frame or motor mount for each of the plurality of mounting positions through which the mounting hardware can attach the electric motor to the frame.

6. The electric motor of claim 5, wherein the apertures are arranged in a vertical line.

7. The electric motor of claim 5, wherein the apertures are arranged in an arc.

8. The electric motorcycle of claim 1, wherein the adjustable motor mount assembly enables the pinion sprocket or pulley to be moved vertically.

9. The electric motor of claim 1, wherein the adjustable motor mount assembly enables the pinion sprocket or pulley to be adjusted radially relative to the suspension pivot point.

10. The electric motorcycle of claim 1, further comprising an additional rear wheel supported by the chassis.

11. The electric motorcycle of claim 1, wherein the adjustable motor mount assembly comprises an adjustment mechanism enabling vertical or radial adjustment of the pinion sprocket or pulley at discrete incremental positions or infinitely variable positions.

12. The electric motorcycle of claim 11, wherein, the adjustment mechanism comprises an adjustment screw or removable hardware.

13. The electric motorcycle of claim 1, wherein the flexible transmission member comprises a roller chain or a belt.

14. A method of adjusting the squat ratio of an electric motorcycle comprising a front wheel; a rear wheel; a chassis comprising a front suspension on which the front wheel is mounted, a rear suspension on which the rear wheel is mounted, and a frame connected to the front suspension and the rear suspension, said rear suspension comprising a swing arm having a first portion pivotally connected to the frame at a suspension pivot point and a second portion supporting an axle of the rear wheel; an electric motor with a transmission assembly including a pinion sprocket or pulley and a flexible transmission mechanism for providing a motive force to the rear wheel; and an adjustable motor mount assembly having a plurality of mounting positions for connecting the electric motor to the frame in a selected one of a plurality of mounting positions, the method comprising the steps of:

adjusting the pinion sprocket or pulley relative to the frame from a current mounting position to another mounting position; and fixing the pinion sprocket or pulley at said another mounting position to thereby adjust the squat ratio of the motorcycle.

15. The method of claim 14, wherein adjusting the squat ratio of the motorcycle does not affect the motorcycle geometry.

16. The method of claim 15, wherein the motorcycle geometry comprises chassis parameters including front and rear ride height, rake and trail, seat height, and wheelbase of the electric motorcycle.

17. The method of claim 14, wherein adjusting the squat ratio of the motorcycle does not significantly change a center of mass position of the electric motorcycle.

18. The method of claim 14, wherein adjusting the pinion sprocket or pulley relative to the frame comprises moving the pinion sprocket or pulley vertically.

19. The method of claim 14, wherein adjusting the pinion sprocket or pulley relative to the frame comprises moving the pinion sprocket or pulley radially relative to the suspension pivot point.

20. The method of claim 14, wherein the adjustable motor mount assembly comprises an adjustment mechanism enabling vertical or radial adjustment of the pinion sprocket or pulley at discrete incremental positions or infinitely variable positions.

21. The method of claim 14, wherein, the adjustment mechanism comprises an adjustment screw or removable hardware.

22. The method of claim 14, wherein the flexible transmission member comprises a roller chain or a belt.

* * * * *